(12) United States Patent
Manabe et al.

(10) Patent No.: US 7,701,187 B2
(45) Date of Patent: *Apr. 20, 2010

(54) DC CONVERTER WITH HALT MODE SETTING MEANS

(75) Inventors: Katsuhiko Manabe, Hyogo-ken (JP);
Tomonari Katoh, Osaka-fu (JP);
Minoru Sugiyama, Hyogo-ken (JP);
Makoto Matsushima, Hyogo-ken (JP);
Tadayoshi Ueda, Hyogo-ken (JP)

(73) Assignee: Ricoh Company, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/216,221

(22) Filed: Jul. 1, 2008

(65) Prior Publication Data

US 2008/0272759 A1    Nov. 6, 2008

Related U.S. Application Data

(63) Continuation of application No. 11/705,584, filed on Feb. 13, 2007, now Pat. No. 7,408,334, which is a continuation of application No. 11/350,742, filed on Feb. 10, 2006, now Pat. No. 7,193,400, which is a continuation of application No. 11/170,745, filed on Jun. 30, 2005, now Pat. No. 7,075,279, which is a continuation of application No. 10/653,208, filed on Sep. 3, 2003, now Pat. No. 6,922,043.

(30) Foreign Application Priority Data

Sep. 6, 2002    (JP)    ............... 2002-261234

(51) Int. Cl.
*G05F 1/56* (2006.01)
(52) U.S. Cl. ..................... 323/283; 323/351
(58) Field of Classification Search ............... 323/282, 323/283, 351
See application file for complete search history.

(56) References Cited

U.S. PATENT DOCUMENTS

| 4,920,246 | A | 4/1990 | Aoki |
| 6,297,623 | B1 | 10/2001 | Balakrishnan et al. |
| 6,711,035 | B2 | 3/2004 | Tomioka |
| 6,922,043 | B2 * | 7/2005 | Manabe et al. ............ 323/283 |
| 7,075,279 | B2 | 7/2006 | Manabe et al. |
| 7,193,400 | B2 | 3/2007 | Manabe et al. |
| 7,408,334 | B2 * | 8/2008 | Manabe et al. ............ 323/283 |

\* cited by examiner

*Primary Examiner*—Jeffrey L Sterrett
(74) *Attorney, Agent, or Firm*—Dickstein Shapiro LLP

(57) ABSTRACT

A DC converter with a halt mode setting is disclosed for preventing the occurrence of over-current while alleviating the increase in the size of circuits, along with a method for setting up such a halt mode. The DC converter includes a semiconductor switch, a clock generator for outputting a clock signal to a gate of the semiconductor switch to be utilized for controlling an on/off time of the semiconductor switch such that a predetermined power is output from the generator, and a drive circuit for switching the semiconductor switch to the continuous-on state according to a halt mode setting requirement regardless of the clock signal, when the semiconductor switch, normally repeating on/off operations responsive to the clock signal, is in its off-state.

9 Claims, 7 Drawing Sheets

DC CONVERTER WITH HALT MODE SETTING MEANS

CROSS REFERENCE TO RELATED APPLICATIONS

This application is a continuation of U.S. patent application Ser. No. 11/705,584, filed on Feb. 13, 2007, now U.S. Pat. No. 7,408,334, which is a continuation of U.S. patent application Ser. No. 11/350,742 filed on Feb. 10, 2006, now U.S. Pat. No. 7,193,400, which is a continuation of U.S. patent application Ser. No. 11/170,745 filed on Jun. 30, 2005, now U.S. Pat. No. 7,075,279, which is a continuation of U.S. patent application Ser. No. 10/653,208, filed on Sep. 3, 2003, now U.S. Pat. No. 6,922,043, which claims priority to Japanese Patent Application No. 2002-261234, filed on Sep. 6, 2002, the disclosures of each are hereby incorporated by reference in their entireties.

FIELD OF THE INVENTION

The invention generally relates to DC converters having a halt mode setting operation for preventing the occurrence of over-current while minimizing the size of circuits. A related method for setting up halt modes is also disclosed.

This document claims priority to Japanese Patent Application No. 2002-261234, filed with the Japanese Patent Office on Sep. 6, 2002, the entire contents of which are hereby incorporated by reference.

BACKGROUND OF THE INVENTION

Power circuits have been used in various electronic circuits to convert incoming electrical signals to a desired voltage type (e.g., alternating current (AC), direct current (DC), etc.). Circuits capable of converting signals into DC by controlling on/off-time of semiconductor switches are increasingly becoming more important. These circuits can be brought to a halt (or dormant) mode when the operation mode of a controlling CPU (which implements power feeding) is switched to a low current consuming state, in which a relatively small amount of current flows in the circuit.

Under this halt mode, the operation mode, in which the semiconductors switch as a chopper unit, is switched to the "always-on" state so as to raise the output voltage, whereby the on/off control unit of the semiconductor switch in the power circuit is halted and the amount of power consumed by the control unit is reduced.

FIG. 6 illustrates a schematic diagram of a known DC converter C3 provided with the above-mentioned halt mode. The DC converter C3 includes at least a DC chopper circuit 100, a drive circuit 200 for switching the DC chopper circuit 100 from regular operation mode to halt mode, and a current limiter 300 for preventing the flow of over-current through respective circuit elements included in the DC chopper circuit 100.

The DC chopper circuit 100 is formed using a P-channel type MOSFET as a semiconductor switch 1, with a source terminal receiving a source voltage $V_{DDB}$; a diode 2 connected to the drain terminal of P-channel type MOSFET 1, a reactance inductor 3, a capacitor 4 for voltage output, and a signal generator 5 for generating pulse width modulation (PWM) clock signals to be utilized for controlling the on/off time of semiconductor switch 1 so that a constant output voltage $V_{out}$ is obtained. This signal generator is hereinafter referred to as clock generator 5.

If a halt mode set-up signal is at the low level, the drive circuit 200 shown in FIG. 6 alternately switches the voltage of the signals PHS output from point A to high (HI) and low (LO) levels by turning on pMOS 205 and nMOS 210, respectively, according to PWM clock signals input by the clock generator 5.

In this case, the drive circuit 200 operates such that both MOS transistors 205, 210 are required to be in an off-state before one of them is subsequently turned on. The PHS output from point A of drive circuit 200 is then applied to the gate of the semiconductor switch 1 in the DC chopper circuit 100. In addition, when the halt mode set-up signal is switched from LO to HI, the drive circuit 200 operates to output HI and LO signals to pMOS 205 and nMOS 210, respectively, regardless of the level of the clock signals output from clock generator 5. The semiconductor switch 1 in DC chopper circuit 100 is therefore brought to the always-off state, at which point the current limiter 300 initiates its operation.

However, since the transistors used as the semiconductor switch 1 are typically of a low-current (i.e., slow response) type, the circuit is particularly susceptible to over-current conditions.

For the sake of simplicity, further detail regarding the operation of the drive circuit 200 will be abbreviated since they are well-known to those skilled in the art.

The current limiter 300 includes a comparison unit for detecting drain current of the semiconductor switch 1 and comparing the detected drain current with a predetermined current value. A switch unit switches the semiconductor switch 1 to the off-state when the drain current exceeds the predetermined current value by outputting HI signals to the gate of semiconductor switch 1. The switch unit switches the semiconductor switch 1 regardless of the signals output from drive circuit 200, which provides an output based on the output of the comparison unit at the moment when the drain current exceeds the predetermined current value. The on/off control from the drive circuit 200 is triggered when the drain current falls below the predetermined current value by outputting LO signals to the gate of semiconductor switch 1. In order to reduce the current consumed in the current limiter 300 under an emergency measure, the semiconductors of a low current consuming type, or slow response type, have been used for forming the switch unit, as described above.

When the semiconductor switch in the DC chopper unit is in either the high (HI) or low (LO) level in the noted DC converter C3, the halt mode set-up signal is switched from the low (LO) to high (HI) level and then the signal PHS is output from the point A of the drive circuit 200.

FIG. 7A illustrates the change in the output voltage $V_{out}$ over time, as well as the drain current, and the voltage PHS applied to the gate of semiconductor switch 1, when the semiconductor switch in the DC chopper unit 100 is in the on-state and the halt mode set-up signal is switched from LO to HI. The drawing plots the voltage (V) and current (A), vertically, over time (μs), in which the time, 0 (μs), corresponds to the instant the halt mode set-up signal is switched from LO to HI. Since the resistance is relatively small for the semiconductor switch 1 in the on-state and considerably small for the inductor 3, the over-current causes current to flow into the output capacitor 4 as soon as the semiconductor switch 1 is switched to the continuous-on state, regardless of the clock signals.

As illustrated in FIG. 7A, the current flowing through semiconductor switch 1 increases rapidly over time to reach its maximum of approximately 2 A after around 20 μs. As noted earlier, if the amount of the drain current exceeds a predetermined value, the current limiter 300 limits the PHS voltage to bring semiconductor switch 1 into the off-state. However, since the transistors in the current limiter 300 are of a low current consuming type, or slow responding type, when the semiconductor switches to reduce the normal current consumption, the occurrence of the over-current remains a problem.

FIG. 7B illustrates the characteristics of the output voltage $V_{out}$, the drain current, and the voltage PHS applied to the gate of semiconductor switch 1 over time when the semiconductor switch 1 included in DC chopper circuit 100 has been completely turned off and the halt mode set-up signal is switched from LO to HI.

Typically, a predetermined period of time (such as 50 μs, for example) will pass before the semiconductor switch 1, which has been turned off previously, switches on again. This period of time allows the current limiter 300, formed with the semiconductor switches of slow driving capability, to adequately respond to the switching behavior of the circuit without causing the noted over-current. In addition, if the current limiter 300 is formed with semiconductor switches having the driving capability suitable for responding to the switching, the increase in size of the semiconductor elements will not be as great.

As illustrated in FIG. 7B, the drain current of the semiconductor switch 1 starts increasing approximately after 80 μs and the current limiter 300 starts properly functioning after about 100 μs, whereby the occurrence of the over-current can be prevented. When the system is set to the halt mode during the on-state period of the semiconductor switch 1, the starting of proper operation for the current limiter 300 is delayed for a certain period of time, thereby causing a momentous flow of over-current.

As one of the measures to alleviate the over-current, the current limiter 300 may be formed with semiconductor switches of high driving capability, i.e., fast responding. This measure, however, may result in undue increase in current consumption as well as production costs.

BRIEF SUMMARY OF THE INVENTION

Accordingly, an exemplary embodiment of the invention provides a DC converter with a halt mode setting for preventing the occurrence of over-current while alleviating the increase in the size of circuits. Also, an exemplary method for setting up such halt mode is also disclosed, having most, if not all, of the advantages and features of similar employed apparatuses and methods, while reducing or eliminating many of the aforementioned disadvantages.

The following description is a synopsis of only selected features and attributes of the present disclosure. A more complete description thereof is found below in the section entitled "Description of the Preferred Embodiments"

A DC converter according to an exemplary embodiment includes a semiconductor switch, and a clock generator for outputting a clock signal to a gate of the semiconductor switch to be utilized for controlling an on/off time of the semiconductor switch such that a predetermined power is output from the generator. The DC converter further includes a drive circuit for switching the semiconductor switch into the continuous-on state according to a halt mode setting requirement regardless of the clock signal when the semiconductor switch normally repeating on/off operations in response to the clock signal is in its off-state.

The drive circuit may further include a signal synchronization unit for switching the semiconductor switch into the continuous-on state according to the halt mode setting requirement after the semiconductor switch is turned off in response to the clock signal input from the clock generator.

In addition, the drive circuit may further include an off-signal generator unit for switching the semiconductor switch into the continuous-on state according to the halt mode setting requirement, after the semiconductor switch is turned off regardless of the clock signal input from the clock generator.

An exemplary method is also disclosed for setting up a halt mode for a DC converter that includes a semiconductor switch, and a clock generator for outputting a clock signal to a gate of the semiconductor switch for controlling an on/off time of the semiconductor switch so that a predetermined power signal is output from the semiconductor switch. The method includes the step of switching the semiconductor switch into a continuous-on state according to a halt mode setting requirement, regardless of the clock signal, when the semiconductor switch normally repeating on/off operations in response to the clock signal is in the off-state. The method may include a further step of switching the semiconductor switch to the continuous-on state according to the halt mode setting requirement after the semiconductor switch is turned off in response to the clock signal input from the clock generator. In addition, the method may include a further step of switching the semiconductor switch to the continuous-on state according to the halt mode setting requirement after the semiconductor switch is compulsorily turned off, regardless of the clock signal input from the clock generator.

These and other features and advantages of the invention will be more clearly seen from the following detailed description of the invention which is provided in connection with the accompanying drawings.

DETAILED DESCRIPTION OF THE INVENTION

In the detailed description which follows, specific embodiments of a DC converter with a halt mode setting function are described, which is capable of preventing the occurrence of over-current while alleviating the increase in the size of circuits. It is understood, however, that the present disclosure is not limited to these embodiments. For example, the use of the DC converter disclosed herein may also be adaptable to any form of electronic circuits and systems. Other embodiments will be apparent to those skilled in the art upon reading the following description.

Figure 1:
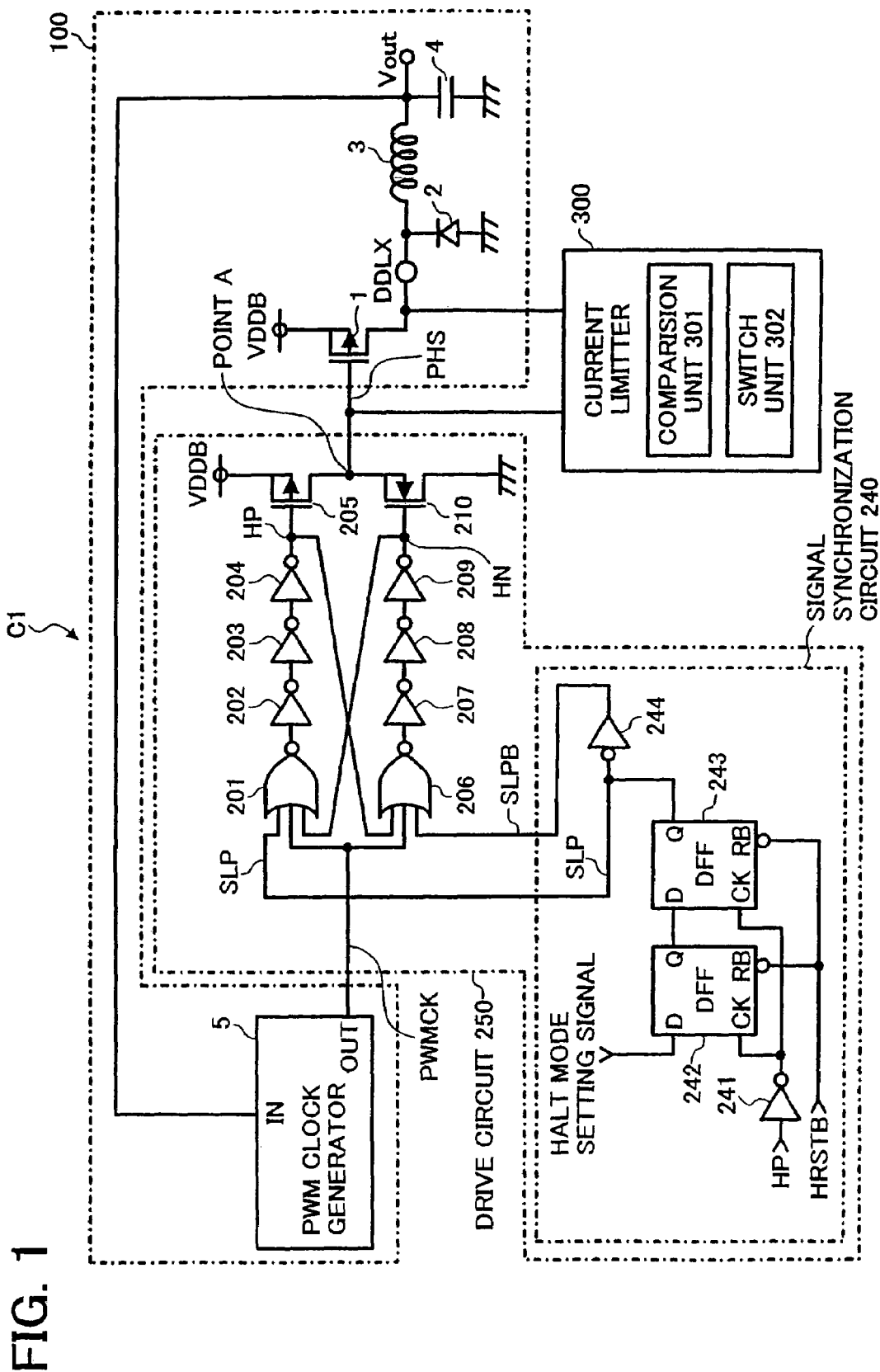
FIG. 1 is a schematic diagram illustrating a DC converter provided with the halt mode according to an exemplary embodiment of the invention.
Figure 2:
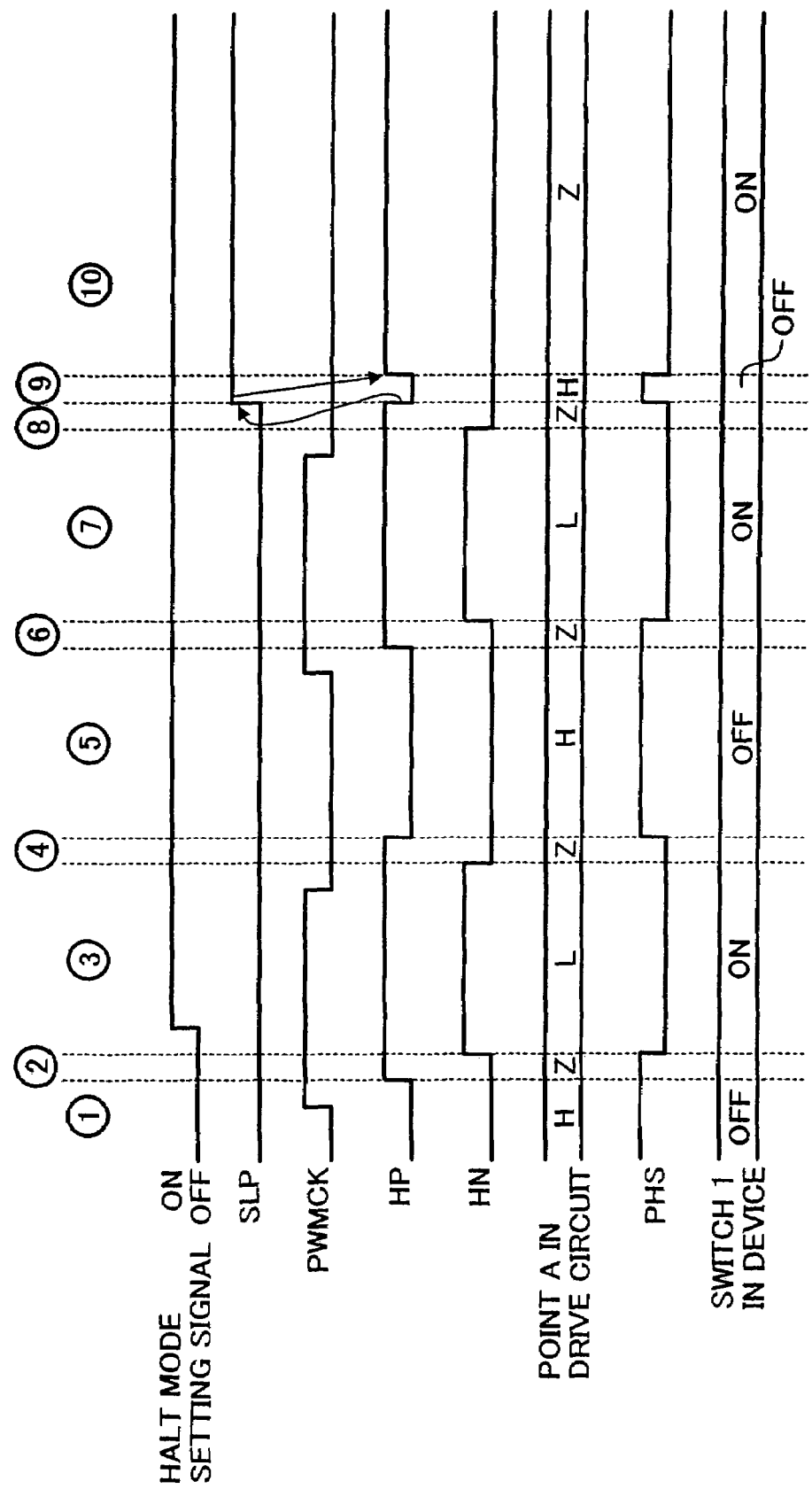
FIG. 2 includes a timing diagram illustrating an operation of the DC converter of FIG. 1.

FIG. 1 is a schematic diagram illustrating a DC converter C1 provided with the halt mode according to one embodiment disclosed herein, while FIG. 2 includes a timing chart for the operation of the DC converter.

Figure 6:
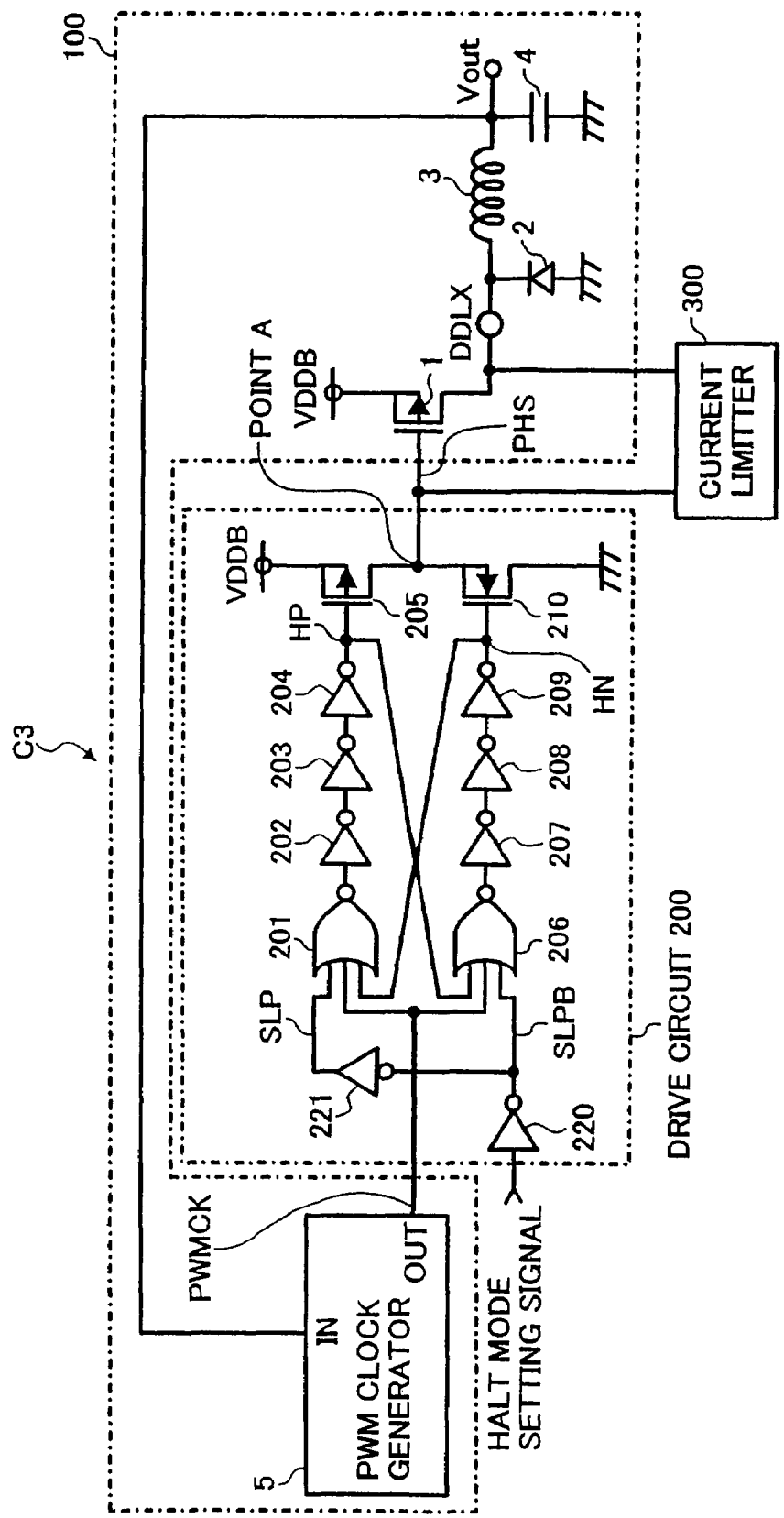
FIG. 6 is a schematic diagram illustrating a known DC converter provided with a halt mode.
Figure 7A:
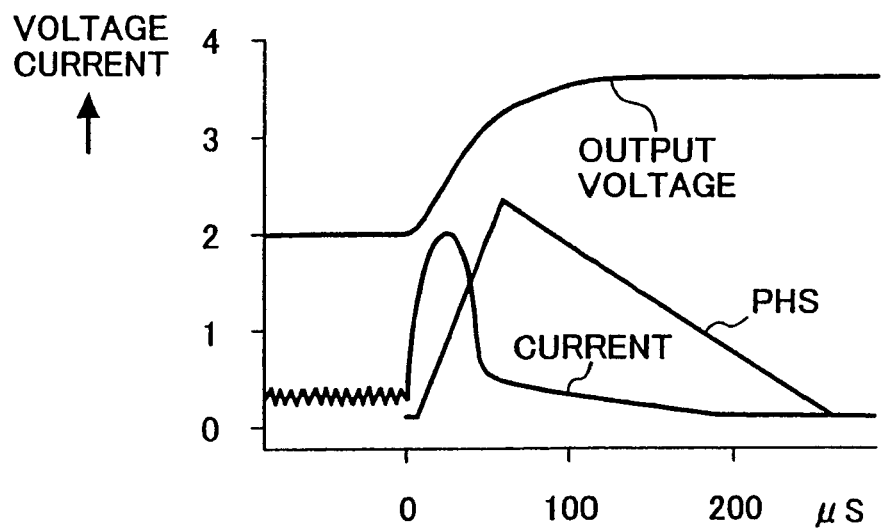
FIG. 7A illustrates the change over time in the output voltage $V_{out}$, the drain current, and the voltage PHS of the DC converter in FIG. 6, when the semiconductor switch in the DC chopper unit 100 is in the on-state and the halt mode set-up signal is switched from low to high.
Figure 7B:
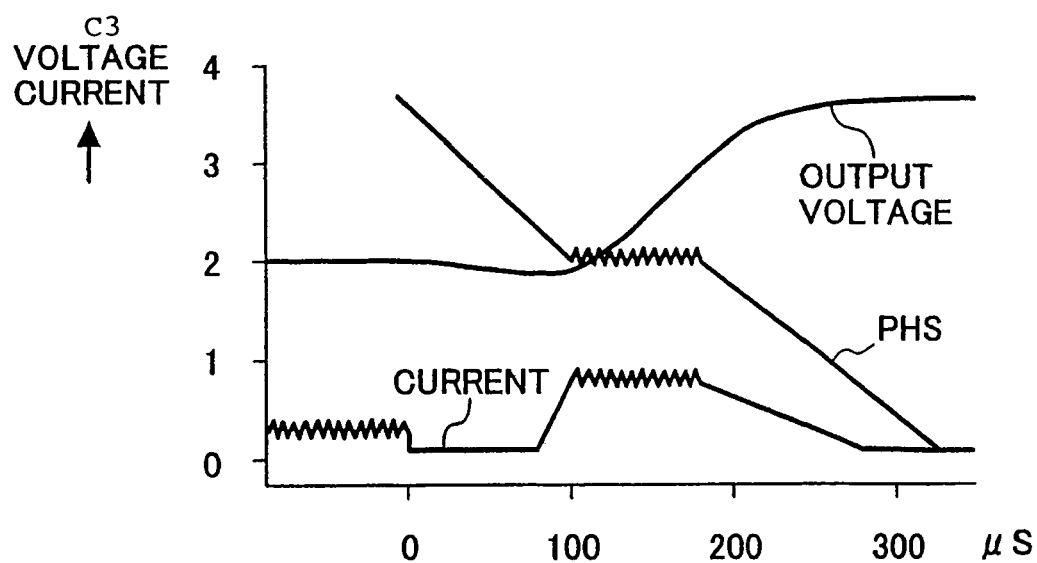
FIG. 7B illustrates the change over time in the output voltage $V_{out}$, the drain current, and the voltage PHS of the DC converter in FIG. 6, when the semiconductor switch 1 included in DC chopper circuit has been completely turned off and the halt mode set-up signal is switched from low to high.

The components in the circuit of FIG. 1 that are similar to those of the known DC converter C3 described earlier in reference to FIG. 6 are shown with identical numerical representations and detailed description thereof is herein abbreviated.

Referring now to FIG. 1, the DC converter C1 includes at least a DC chopper circuit 100, a drive circuit 250 and a current limiter 300. The DC chopper circuit 100 includes a P-channel type MOSFET, used as a semiconductor switch 1, with the source voltage $V_{DDB}$ being applied to its source terminal, and a diode 2 being connected to the drain terminal. A reactance inductor 3, a capacitor 4 for voltage output, and a signal generator 5 are also provided for generating pulse width modulation (PWM) clock signals for controlling the on/off time of semiconductor switch 1 so that a constant output voltage $V_{out}$ is obtained. This signal generator is hereinafter referred to as clock generator 5. Drive circuit 250 is coupled between the clock generator 5 and the gate of semiconductor switch 1. The drive circuit 250 is discussed in greater detail below.

The current limiter 300 includes a comparison unit 301 for detecting drain current of the semiconductor switch 1 and comparing the detected current with a predetermined current value. When the drain current exceeds the predetermined value, switch unit 302 outputs a HI (high) signal to the gate of semiconductor switch 1 to switch the semiconductor switch 1 to the off-state. In this case, the HI signal is transmitted regardless of the signals output from drive circuit 250. When the drain current falls below the predetermined values, switch unit 302 outputs a LO (low) signal to the gate of semiconductor switch 1 for re-enabling the on/off control by the drive circuit 250.

In order to reduce the current consumed in the current limiter 300 as an emergency measure, the semiconductors used in the switch unit are preferably of a low current consuming type, i.e., slow response type, as described above.

The drive circuit 250 includes triple-input NOR gate 201 and NAND gate 206, which receive fed-back signals HP and HN as shown in FIG. 1. The output from the NOR gate 201 is subsequently inverted via three inverters, 202 through 204, wherein the inverters delay the signal output by a predetermined period of time. The output from the NAND gate 206 is subsequently inverted via three inverters, 207 through 209, which similarly invert and delay the signal by another predetermined period of time. A P-channel type MOSFET 205 (which is hereinafter referred to as pMOS) receives the inverted signal HP from the NOR gate 201 at its gate terminal, while a N-channel type MOSFET 210 (hereinafter as nMOS) receives the inverted signal HN from the NAND gate 206 at its gate terminal.

The signal synchronization circuit 240 includes two inverters 241, 244 and a two-staged D-flip-flop 242, 243 (hereinafter as D-FF).

The internal signal HP in the drive circuit 250 is inverted by the inverter 241 and subsequently inputted to the clock input terminals of the D-FF, while HRSTB signals are input to reset terminals of the D-FF. The HRSTB signals are switched to HI when the DC converter C1 is initialized.

Halt mode set-up signals are input to the data input terminal D of the D-FF 242, while the output Q of D-FF 242 is input to the data input terminal of D-FF 243.

The output Q of D-FF 243 is input as SLP signals to the signal input terminal of NOR gate 201. Further, the signals SLPB, which are formed by inverting the output Q of D-FF 243 by the inverter 244, are transmitted to the input terminal of NAND gate 206.

The SLP signals output from signal synchronization circuit 240 and PWM clock signals output from the clock generator 5 are respectively coupled to the remaining terminals of the triple-input NOR gate 201. The SLPB signals (i.e., inverted SLP signals) output from signal synchronization circuit 240 and PWM clock signals output from the clock generator 5 are respectively coupled to the remaining terminals of the triple-input NAND gate 206.

The source terminal of pMOS 205 receives a voltage $V_{DDB}$, and the drain terminal of pMOS 205 is connected to the drain terminal of nMOS 210. The source terminal of NMOS 210 is coupled to ground.

If a halt mode set-up signal is at the low level (LO), LO SLP signals and HI SLPB signals are output from the signal synchronization circuit 240. In this case, pMOS 205 and NMOS 210 are alternately turned on corresponding to PWM clock signals input by the clock generator 5, and the voltage of the signals PHS output from the point A are switched to HI and LO, alternately. Furthermore, both MOS transistors 205, 210 should be in an off-state before one of them be turned on. The gate terminal of semiconductor switch 1 in DC chopper circuit 100 receives the signals PHS output from the point A of drive circuit 250.

When the halt mode set-up signal is switched from LO to HI, the signal synchronization circuit 240 operates as follows: subsequent to the signal HP being switched to LO corresponding to clock signals and the semiconductor switch 1 in chopper circuit 100 being turned off, the circuit 240 functions to switch the SLP signal to HI and SLPB signal to LO (as illustrated by the time intervals, 8 and 9, in FIG. 2).

As a result, the PHS signal is switched from HI to LO, which makes the semiconductor switch 1 switch to the continuous-on state regardless of the clock signals.

In order to turn off the semiconductor switch 1, the clock generator 5 ceases to output HI clock signals during these steps. Accordingly, the current consumption in the clock generator 5 can be reduced.

Figure 3:
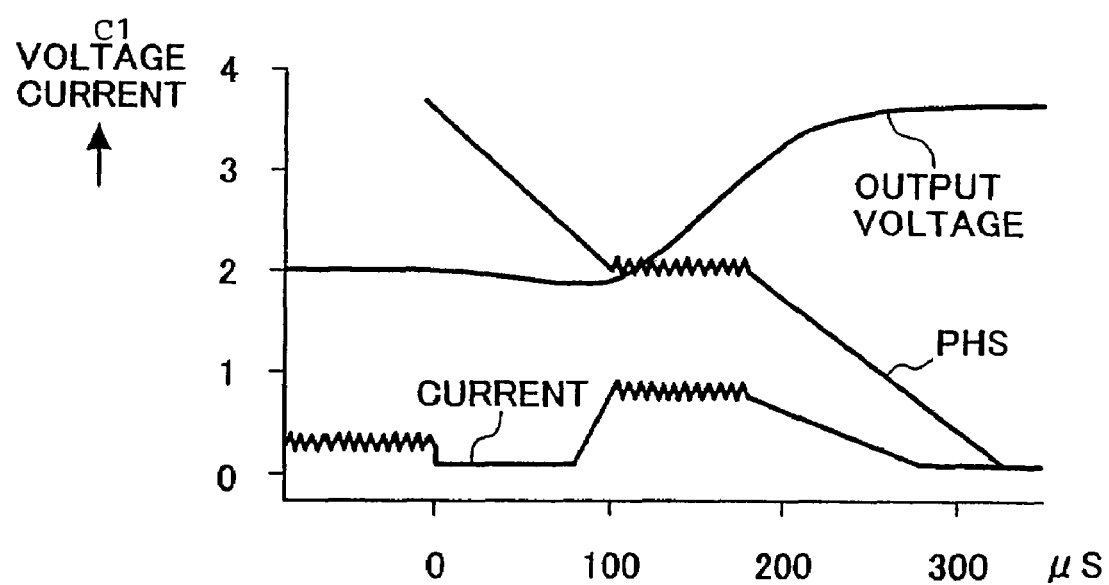
FIG. 3 illustrates the change in the output voltage $V_{out}$, the drain current, and the voltage PHS applied to the gate of semiconductor switch over time, when the halt mode set-up signal is switched from low to high.

FIG. 3 illustrates the change in the output voltage $V_{out}$, the drain current, and the voltage PHS applied to the gate of semiconductor switch 1 over time, when the halt mode set-up signal is switched from LO to HI.

Generally, a predetermined period of time should pass (such as 50 μs, for example) for the semiconductor switch 1, which has been completely turned off previously, to be switched back on. This length of time makes it feasible even for the current limiter 300 formed with semiconductor switches of slow driving capability to adequately respond to the switching behavior of the circuit without causing the noted over-current.

In addition, if the current limiter 300 is formed with semiconductor switches having the driving capability suitable for adequately responding to the switching, the increase in size in semiconductor elements is not so great.

In the exemplary embodiment of FIG. 3, the drain current of the semiconductor switch 1 starts increasing approximately after 80 μs and the current limiter 300 starts functioning after about 100 μs, whereby the occurrence of the over-current can be prevented.

As described above, by utilizing the signal synchronization circuit 240 provided herein, the drive circuit 200 is thus adapted not to switch the semiconductor switch 1 in chopper circuit 100 to the on-state right away when the halt mode set-up signal is switched from LO to HI. Instead, the drive circuit holds its state until the semiconductor switch 1 is switched to LO corresponding to clock signals, and then to switch the PHS signal to LO and accordingly the semiconductor switch 1 to the continuous-on state regardless of the clock signals. As a result, the occurrence of the over-current caused by forced switching of the semiconductor switch can be alleviated.

Although the formation of the DC converter C1 in the present embodiment has been described with the noted drive circuit 250 provided between the clock generator 5 and the gate of semiconductor switch 1, the DC converter C1 may alternatively be formed by directly interconnecting the clock generator 5 and the gate of semiconductor switch 1 with a more simplified drive circuit placed between the clock generator 5 and the gate of semiconductor switch 1. In this case, the drive circuit may include only the signal synchronization circuit 240.

More specifically, the inverter 241 would receive the clock signals from the clock generator 5 in place of the HP signals, and SLPB signals output from D-FF 243 would be applied to the gate of semiconductor switch 1 in chopper circuit 100.

Figure 4:
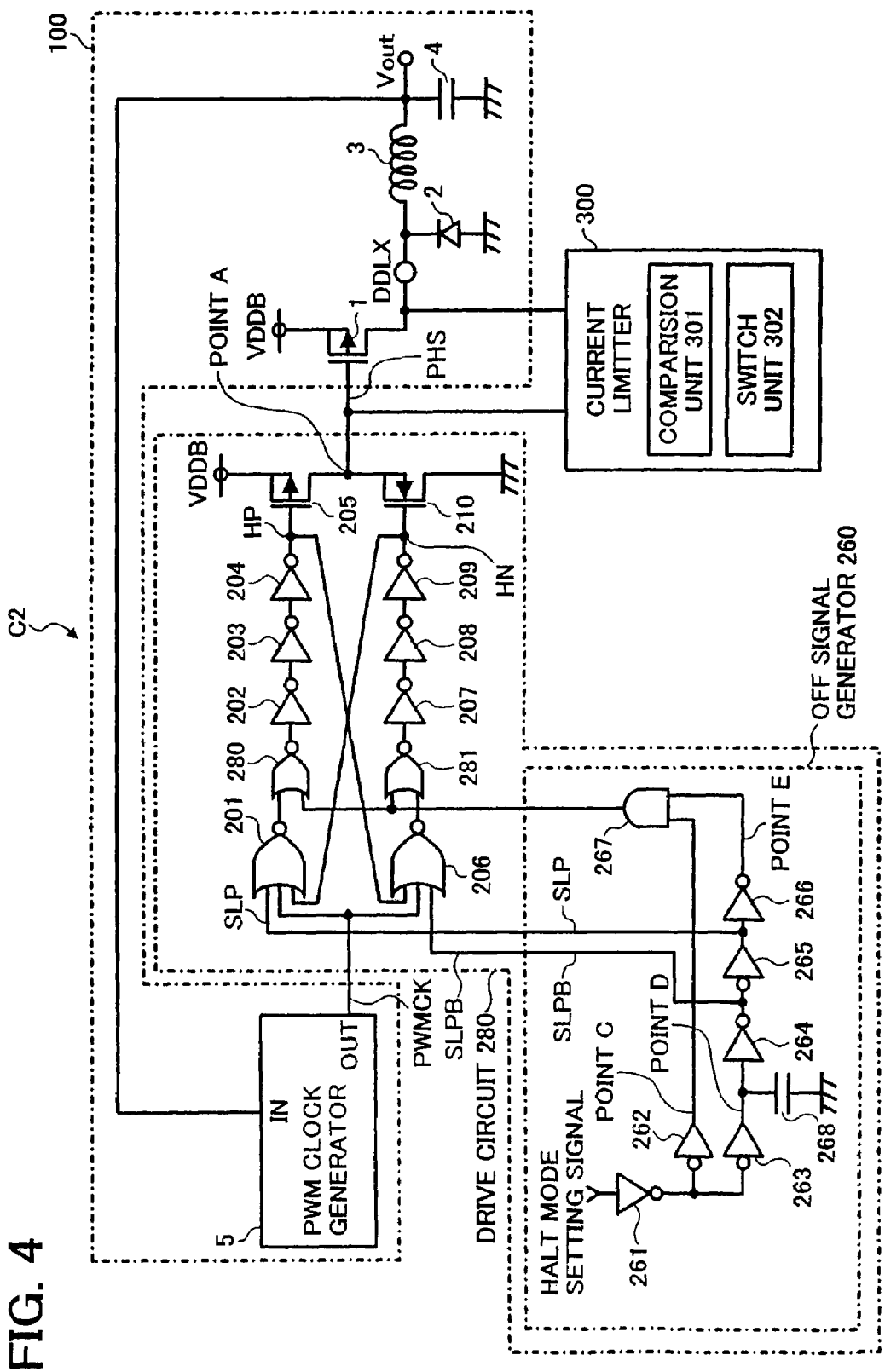
FIG. 4 is a schematic diagram illustrating a DC converter according to another exemplary embodiment of the invention.
Figure 5:
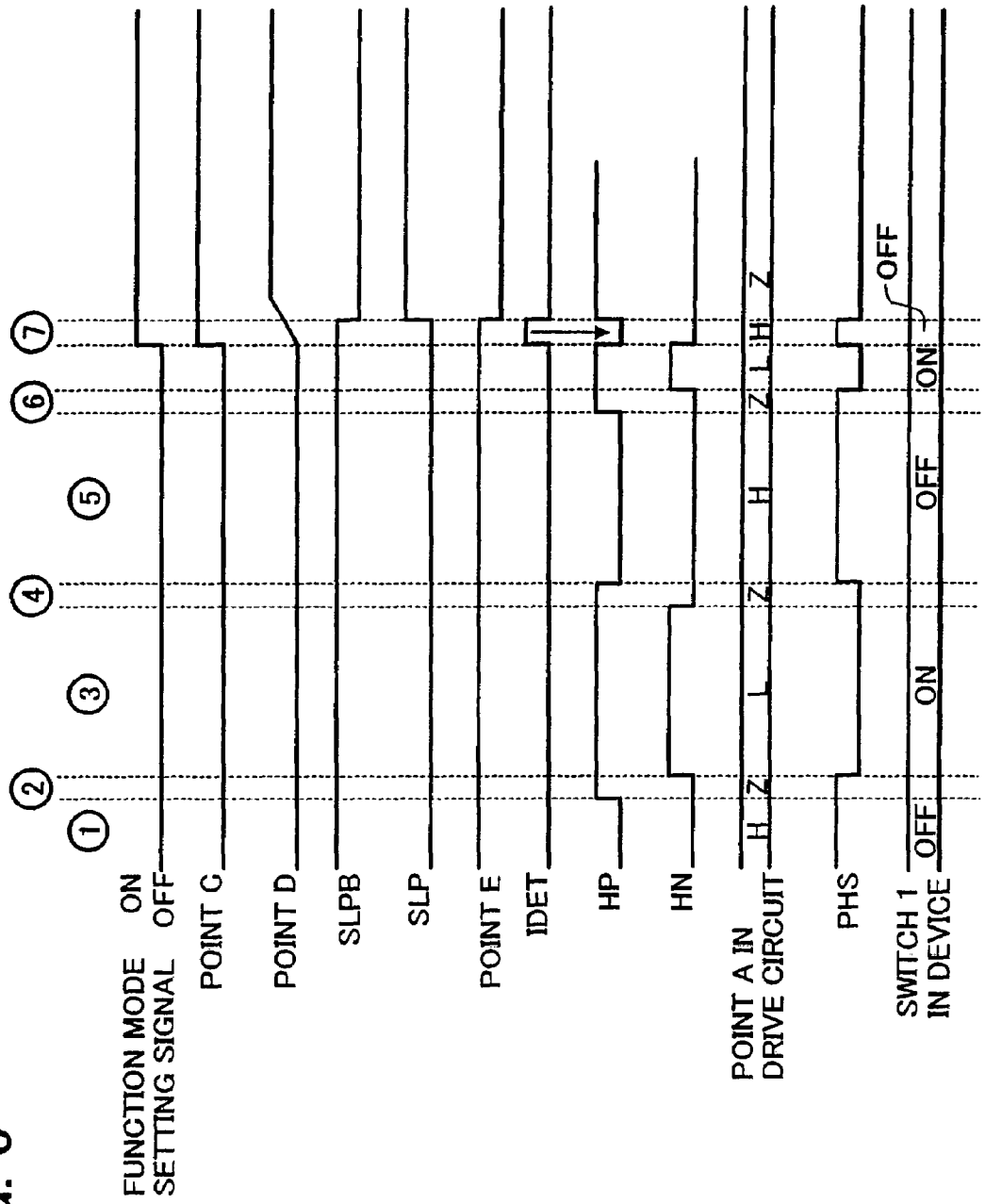
FIG. 5 includes a timing diagram illustrating the operation of the DC converter of FIG. 4.

FIG. 4 is a schematic diagram illustrating a further DC converter C2 according to another exemplary embodiment disclosed herein, while FIG. 5 is a timing diagram illustrating the operation of the DC converter C2. The components in FIG. 4 similar to those of the aforementioned DC converter C1 described FIG. 1 are shown with identical numerical representations and detailed description is therefore omitted.

Referring now to FIG. 4, the DC converter C2 includes at least a DC chopper circuit 100, a drive circuit 280 and a current limiter 300. The drive circuit 280 disclosed herein is formed by replacing the inverters 202, 207 shown in FIG. 1 with NOR gates 280, 281, and the signal synchronization circuit 240 with an off-signal generator 260, respectively.

The drive circuit 280 is thus adapted to operate as follows: subsequent to the signal PHS being forced to switch to HI simultaneously with the input of HI IDET signals, and the semiconductor switch 1 being turned off, the circuit 240 switches the PHS signal to LO and the semiconductor switch 1 to the continuous-on state regardless of the clock signals (as illustrated by the time interval 7 in FIG. 5).

By means of the present drive circuit 280, prompt mode switching becomes feasible and the occurrence of the over-current, which is caused by forced switching of the semiconductor switch in the on-state to the continuous-on state regardless of the clock signals, is alleviated.

The structure and operation of the off-signal generator 260 included in the drive circuit 280 is now described. The off-signal generator 260 includes six inverters, 261 through 266, a double-input AND gate 267, and a capacitor 268 to designate the wiring capacitance of the circuit. The output terminal of inverter 261 is connected to one input terminal of the double-input AND gate 267 by way of inverter 262, as well as to the other input terminal of the AND gate 267 by way of inverters 263 through 266.

The output from the inverter 264 is input, as the SLPB signal, to one of the input terminals of triple-input NOR gate 201 included in the drive circuit 280. The output from the inverter 265 is input as the SLP signals to one of the input terminals of triple-input NAND gate 206 included in the drive circuit 280.

The NAND gate 267 operates to output HI IDET signals only for the period corresponding to the delay time for three inverters. Thereafter, HI SLP signals are output to the drive circuit 280.

By way of the off-signal generator 260 disclosed herein, the drive circuit 280 is adapted to switch the voltage of PHS signal right away to HI and the semiconductor switch 1 in chopper circuit 100 to the off-state when the halt mode set-up signal is switched from LO to HI. Thereafter, the semiconductor switch 1 is switched to the continuous-on state regardless of the clock signals.

As a result, the occurrence of the over-current caused by forced switching of the semiconductor switch is alleviated, as shown in FIG. 3.

In addition, the concurrent increase in output voltage $V_{out}$ results in halting the operation of the clock generator 5, whereby the current consumption in the clock generator 5 can be reduced.

It is apparent from the above description including the examples the DC converters disclosed herein above are advantageous over previously known similar devices and can be incorporated into various circuits and apparatuses.

For an example, since the present DC converter is adapted, when the semiconductor switch is in its off-state, for switching the semiconductor switch to the continuous-on state according to a halt mode setting requirement regardless of the clock signal, the occurrence of the over-current can be alleviated, which is caused by switching the semiconductor switch in the on-state to the continuous-on state.

In addition, the drive circuit is also adapted for switching the semiconductor switch to the continuous-on state according to a halt mode setting requirement regardless of the clock signal, when the semiconductor switch normally repeating on/off operations responsive to the clock signal is in its off-state. As a result, the noted occurrence of the over-current can be alleviated.

Furthermore, the drive circuit is adapted for switching the semiconductor switch to the continuous-on state according to the halt mode setting requirement after the semiconductor switch is forcibly turned off regardless of the clock signal input from the clock generator. As a result, prompt mode switching becomes feasible and the occurrence of the over-current, which is caused by forced switching of the semiconductor switch in the on-state to the continuous-on state, can be alleviated.

The process steps set forth in the present description on the fabrication of MOS transistors and semiconductor apparatuses incorporating the transistors may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Additional modifications and variations of the present invention are possible in light of the above teachings. It is therefore to be understood that within the scope of the appended claims, the invention may be practiced other than as specifically described herein.

What is claimed as new and desired to be protected by Letters Patent of the United States is:

1. A DC converter comprising:
   a DC chopper circuit comprising a switch; and
   a drive circuit for switching said switch to a continuous-on state according to a halt mode setting requirement, when said switch, normally repeating on/off operations responsive to a clock signal is in an off-state.

2. The DC converter according to claim 1, wherein said drive circuit comprises a signal synchronization unit for switching said switch to a continuous-on state according to said halt mode setting requirement after said switch is turned off in response to said clock signal.

3. The DC converter according to claim 1, wherein said drive circuit comprises an off-signal generator unit for switching said switch to a continuous-on state according to said halt mode setting requirement, after said switch is forcibly turned off, regardless of said clock signal.

4. A method for setting up a halt mode for a DC converter, said method comprising the steps of:
   determining when a switch in a DC chopper circuit is in an off-state; and
   receiving a halt mode signal at said switch during said off-state,
   wherein said halt mode signal turns said switch to a continuous-on state, regardless of the state of a clock signal input.

5. The method according to claim 4, further comprising turning said switch to a continuous-on state in response to said halt mode signal after said switch is turned off in response to said clock signal.

6. The method according to claim 4, further comprising switching said switch to a continuous-on state in response to said halt mode signal after said switch is forcibly turned off.

7. A DC converter, comprising:
   a DC chopper circuit comprising a switch;
   a drive circuit means for outputting a halt mode setting requirement; and
   a current limiter means for monitoring an output from said switch and for preventing current overflow in said drive circuit,
   wherein said drive means switches said switch to a continuous-on state according to the halt mode setting requirement when said switch, normally repeating on/off operations responsive to a clock signal, is in an off-state.

8. The DC converter according to claim 7, wherein said drive circuit means includes signal synchronization means for switching said switch to a continuous-on state according to said halt mode setting requirement, after said switch is turned off responsive to said clock signal.

9. The DC converter according to claim 7, wherein said drive circuit means includes an off-signal generator means for switching said switch to a continuous-on state according to said halt mode setting requirement, after said switch is forcibly turned off.

* * * * *